Patented May 24, 1949

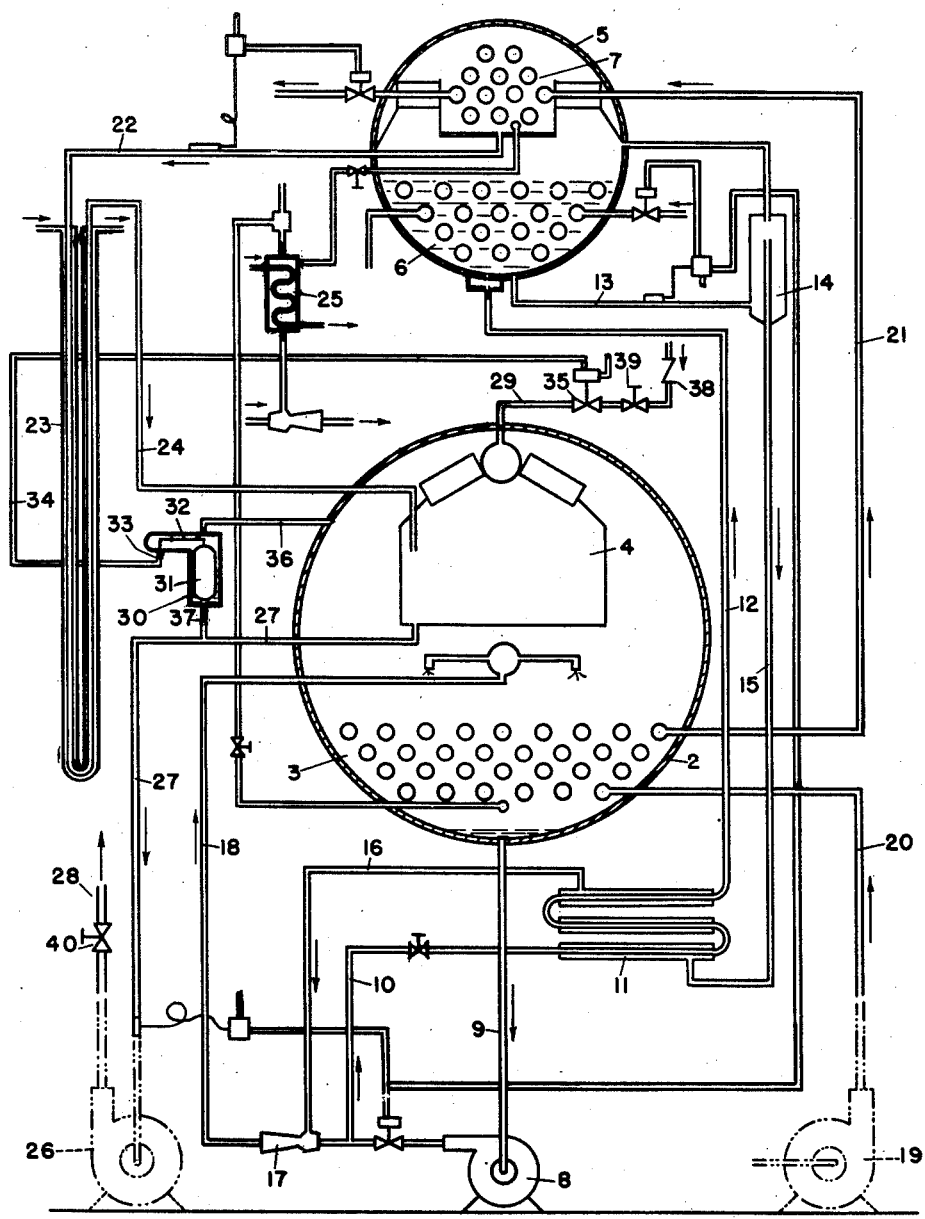

2,470,756

UNITED STATES PATENT OFFICE 2,470,756

CONTROL ARRANGEMENT FOR ABSORPTION REFRIGERATION SYSTEMS

Alexis A. Berestneff, Syracuse, N. Y., assignor to Carrier Corporation, Syracuse, N. Y., a corporation of Delaware Application July 13, 1946, Serial No. 683,389

6 Claims. (Cl. 62—5)

This invention relates to refrigeration systems and more particularly to an absorption refrigeration system including a novel control arrangement for maintaining a desired level of chilled water within the evaporator of the system.

In the co-pending application of Alexis A. Berestneff, entitled "Refrigeration system," Serial No. 683,387, filed July 13, 1946, there is disclosed and claimed an absorption refrigeration system to which the present invention is particularly adapted. It will be understood, of course, the present invention is not limited in its use to such system but may be applied to any absorption refrigeration system in which it is desired to maintain a desired level of chilled water within an evaporator.

The chief object of the present invention is to provide an absorption refrigeration system adapted for air conditioning applications in which the amount of chilled water supplied to the air conditioning system and the amount of chilled water returned to the refrigeration system are balanced to prevent flooding of the evaporator of the refrigeration system.

An object of the invention is to provide a simple economical control member for regulating the level of refrigerant maintained in the evaporator of an absorption refrigeration system. Other objects of my invention will be readily perceived from the following description.

This invention relates to an absorption refrigeration system including an evaporator, an absorber, the evaporator and absorber preferably being enclosed in a single shell, a condenser, and a generator, the condenser and the generator preferably being disposed in a second shell. Suitable means are provided to connect the absorber and the generator and to connect the condenser with the evaporator. In the system, solution is circulated between the absorber and the generator. Conditioning medium such as water is flash-cooled in the evaporator, the flashed vapor passing downward to be absorbed by the solution in the absorber while the chilled water is withdrawn from the evaporator and supplied to an air conditioning system in heat exchange relation with air to be conditioned. A float valve is provided responsive to the water level maintained in the evaporator. Upon a change in water level in the float valve, air pressure is varied in an air line connecting the float valve and a valve in the return line to actuate the return line valve. Upon a rise in water level in the evaporator reflected in the float valve, the return line valve is actuated to move toward a closed position thus decreasing the quantity of water returning to the evaporator; upon a fall or decrease in water level in the evaporator reflected by the float valve, the return line valve is permitted to move toward an open position to increase the quantity of water returning to the evaporator thereby maintaining a desired level in the evaporator.

The attached drawing illustrates diagrammatically an absorption refrigeration system including the control means of the present invention.

Referring to the drawing, there is shown a shell 2 enclosing an absorber 3 and an evaporator 4 disposed thereabove. A second shell 5 is provided which contains a generator 6 and a condenser 7.

Weak solution is withdrawn from absorber 3 by pump 8 through line 9 and is forwarded to the generator 6 through line 10, heat exchanger 11 and line 12. Strong solution is withdrawn from the generator 6 through line 13, overflow arrangement 14, line 15, heat exchanger 11, line 16 to an ejector 17 which forwards strong solution through line 18 to absorber 3. Solution overflow arrangement 14 serves to prevent solution in generator 6 rising above or sinking below a predetermined level and maintains a desired head upon ejector 17.

The term "weak solution" is used herein to define a solution containing a large amount of refrigerant so that the solution is weak in absorbing properties. The term "strong solution" defines a solution which is relatively defficient in refrigerant and consequently a solution which possesses enhanced properties of refrigerant absorption.

A pump 19 passes cooling water through line 20 to the tubes or coils of absorber 3 and then forwards the water after its passage through absorber 3 through line 21 to the tubes or coils of condenser 7; in some cases, if desired, the direction of flow may be reversed, the cooling water being directed first to the coil of the condenser 7 and then to the coil of the absorber 3. It will be understood cooling water may be passed in parallel through coils of the condenser and the absorber. Any suitable means, of course, may be used to supply water for cooling purposes.

A line 22 is used to withdraw vapor condensate from condenser 7, the vapor condensate passing through a precooler assembly 23 and then being returned through line 24 to the evaporator 4.

A suitable purge arrangement designated generally at 25 may be provided to purge condenser 7 and absorber 3 of air or other non-condensible gases. The purge arrangement 25 may be operated intermittently or continuously as desired.

Chilled water treated by the system is withdrawn from evaporator 4 by pump 26 through line 27 and is circulated through line 28 to an air conditioning device of any suitable type (not shown) and is returned to the evaporator 4 from the air conditioning device through line 29. Of course, an expansion tank is provided in the air conditioning device. The returned water is sprayed in the evaporator 4 being flash-cooled, the flashed vapor passing downward to be absorbed by solution in the absorber 3 while the chilled water may be withdrawn from evaporator 4 as described above. Such system is described in detail in the co-pending application above referred to and reference is made thereto for a more full and complete description.

When the absorption refrigeration system so described is connected directly to the air conditioning apparatus to supply conditioning medium such as chilled water, it is important that the quantities of chilled water entering and leaving the absorption system be balanced and that the water level be at a desirable height. The level of chilled water within the evaporator 4 may be maintained to balance the quantities of water leaving the system for passage through the air conditioning equipment and entering the system after passage through the air conditioning equipment.

To maintain a desired level of chilled water in evaporator 4 a float valve 30 is provided. Float valve 30 contains a float 31 connected to a lever 32 carrying a stop 33. An air line 34 connects valve 35 disposed in return line 29 with float valve 30. Valve 35, of course, is attached to the main air line of the system. Valve 35 is normally in open position; under such condition air is permitted to bleed or escape from line 34. An increase in water level in valve 30 raises float 31, actuating lever 32 to move stop 33 against an orifice in line 34 thus preventing air bleeding from line 34 and building up pressure therein tending to urge valve 35 toward a closed position. An equalizing line 36 connects valve 30 to the shell 2 to permit the same pressure to be maintained in valve 30 as exists in shell 2. Valve 35 regulates the quantity of chilled water entering the system after its passage through the air conditioning equipment. Line 37 connects valve 30 with line 27 thus permitting the water level in valve 30 to be maintained at the same height as the water level in evaporator 4.

If desired, a check valve 38 may be disposed in the return line 29 to prevent the return of chilled water to evaporator 4. Manually or electrically operable valves 39 and 40 may be employed, if desired, when the system is shut down for the night or for similar applications.

In the operation of the system, conditioning medium, such as chilled water, is withdrawn from the evaporator 4 by pump 26 and is supplied to the air conditioning unit through line 28. The chilled water returns from the air conditioning unit through line 29 to the spray arrangement of evaporator 4 and is sprayed within evaporator 4. The pressure in shell 2 containing evaporator 4 is maintained under such conditions as to permit the sprayed water to be flash-cooled; that is, some portion of the sprayed water boils off and is absorbed by the solution in the absorber while the remainder of the water is cooled and is contained in evaporator 4.

To prevent flooding of the system, it is desirable that the amount of chilled water in the evaporator be maintained relatively constant. When the level in evaporator 4 increases above a predetermined height, float valve 30 reflecting such increase serves to vary the pressure in control air line 34 thus increasing the air pressure imposed on valve 35 and tending to move valve 35 toward a closed position thereby decreasing the amount of water returning to the evaporator 4. Similarly, when the level in evaporator 4 decreases below a predetermined point, float valve 30 again varies the pressure in air line 34 thereby tending to urge valve 35 toward an open position to increase the quantity of water returning to the evaporator 4. The quantity of chilled water supplied to the air conditioning unit and the quantity of water returned from the air conditioning unit are balanced permitting a desired level of medium to be maintained in the evaporator.

The present invention provides ready and inexpensive means for automatically balancing the quantity of chilled water withdrawn from the system and the quantity of water returned to the system and permits a desired water level to be maintained in the evaporator without interfering in any way with the absorption refrigeration system or necessitating a variation or correction in pressure maintained in the remaining elements of the system.

While I have described and illustrated a preferred embodiment of my invention, it will be understood my invention is not limited thereto since it may be otherwise embodied within the scope of the following claims.

I claim:

1. In an absorption refrigeration system, the combination of a shell, a cooling member in said shell, said shell and said cooling member cooperating to form an absorber, a second member in said shell, said shell cooperating with said second member to form an evaporator, refrigerant supplied to the evaporator being flash-cooled, the flashed vapor passing to the absorber to be absorbed by solution therein, the cooled refrigerant collecting in the evaporator, a generator, a condenser, the absorber, evaporator, generator and condenser being disposed in a closed circuit, a line through which refrigerant is supplied to the evaporator, a second line through which refrigerant is withdrawn from the evaporator, means for passing refrigerant through said lines and the evaporator, control means in said first line for regulating the quantity of refrigerant supplied to the evaporator, and means responsive to variation in refrigerant level in said evaporator for governing the operation of said control means.

2. In an absorption refrigeration system, the combination of a shell, a cooling member in said shell, said shell and said cooling member cooperating to form an absorber, a second member in said shell, said shell cooperating with said second member to form an evaporator, refrigerant supplied to the evaporator being flash-cooled, the flashed vapor passing to the absorber to be absorbed by solution therein, the cooled refrigerant collecting in the evaporator, a generator, a condenser, the absorber, evaporator, generator and condenser being disposed in a closed circuit, a line through which refrigerant is supplied to the evaporator, a second line through which refrigerant is withdrawn from the evaporator, a control valve in said first line regulating the quantity of refrigerant supplied to the evaporator, and means for governing the operation of said control valve in response to a variation in level in said evaporator.

3. An absorption refrigeration system according to claim 2, in which the control valve is responsive to pressure of air supplied thereto and in which the governing means varies the pressure of air on said valve to move said valve toward an open or closed position.

4. In an absorption refrigeration system, the combination of a shell, a cooling member in said shell, said shell and said cooling member cooperating to form an absorber, a second member in said shell, said shell cooperating with said second member to form an evaporator disposed above said absorber, a desired pressure being maintained in said shell, a second shell containing a generator and a condenser, the absorber, evaporator, condenser and generator being disposed in a closed circuit, refrigerant supplied to the evaporator being flash-cooled, the flashed vapor passing downward to the absorber to be absorbed by solution therein, the cooled refrigerant collecting in the evaporator, a line through which refrigerant is supplied to the evaporator, a second line through which refrigerant is withdrawn from the evaporator, a pump for passing refrigerant through said lines and the evaporator, an air pressure operable control valve in said first line for regulating the quantity of refrigerant passing to the evaporator, a float valve, an air line connecting the float valve and the control valve, a line connecting the float valve with said first shell whereby pressure in said chamber substantially corresponds to pressure in said shell, and an element in said chamber adapted to vary the air pressure in said air line, said element being responsive to variation in refrigerant level in said evaporator whereby as the level in said evaporator rises the pressure in said air line is varied to tend to move said valve toward a closed position to decrease the flow of refrigerant to the evaporator and as the refrigerant level in said evaporator decreases the pressure in said air line is varied to tend to move said valve toward an open position.

5. An absorption refrigeration system according to claim 4, in which a check valve is disposed in said first line and a second check valve is disposed in said second line, said valves permitting the chilled water circuit to be closed when operation of the system is discontinued.

6. In an absorption refrigeration system, the combination of a shell, a cooling member in said shell, said shell and said cooling member cooperating to form an absorber, a second member in said shell, said shell cooperating with said second member to form an evaporator, refrigerant supplied to the evaporator being flash cooled, the flashed vapor passing to the absorber to be absorbed by solution therein, the cooled refrigerant collecting in the evaporator, a generator, a condenser, the absorber, evaporator, generator and condenser being disposed in a closed circuit, means for supplying refrigerant to the evaporator, means for withdrawing refrigerant from the evaporator, and means for regulating the supply means to balance the quantity of refrigerant supplied to the evaporator with the quantity of refrigerant withdrawn from the evaporator to maintain a desired level of refrigerant in the system.

ALEXIS A. BERESTNEFF.

REFERENCES CITED

The following references are of record in the file of this patent:

UNITED STATES PATENTS

| Number | Name | Date |
|---|---|---|
| 2,272,856 | Thomas | Feb. 10, 1942 |
| 2,275,997 | Shannon | Mar. 10, 1942 |
| 2,287,441 | McGinnis | June 23, 1942 |
| 2,356,638 | Williams | Aug. 22, 1944 |
| 2,408,480 | Reid | Oct. 1, 1946 |